Nov. 22, 1955
R. O. BRADLEY ET AL
2,724,585
DRIVE FOR AUXILIARY LOAD PRINTING
AND INDICATING MECHANISM
Filed April 5, 1954
8 Sheets-Sheet 1
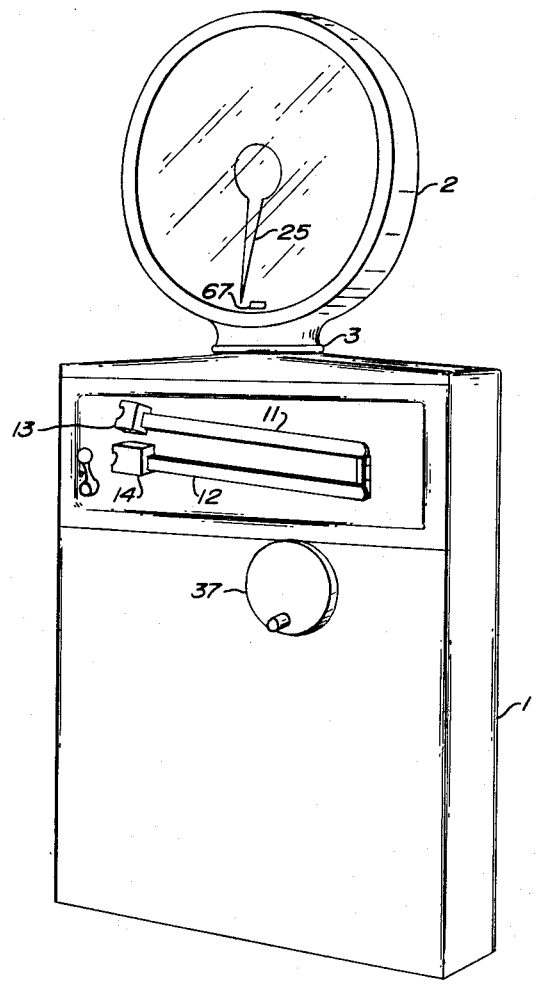
Fig. I
INVENTORS
ROBERT O. BRADLEY
CLAYTON H. MAURICE JR.
BY
Marshall, Marshall & Hastings.
ATTORNEYS

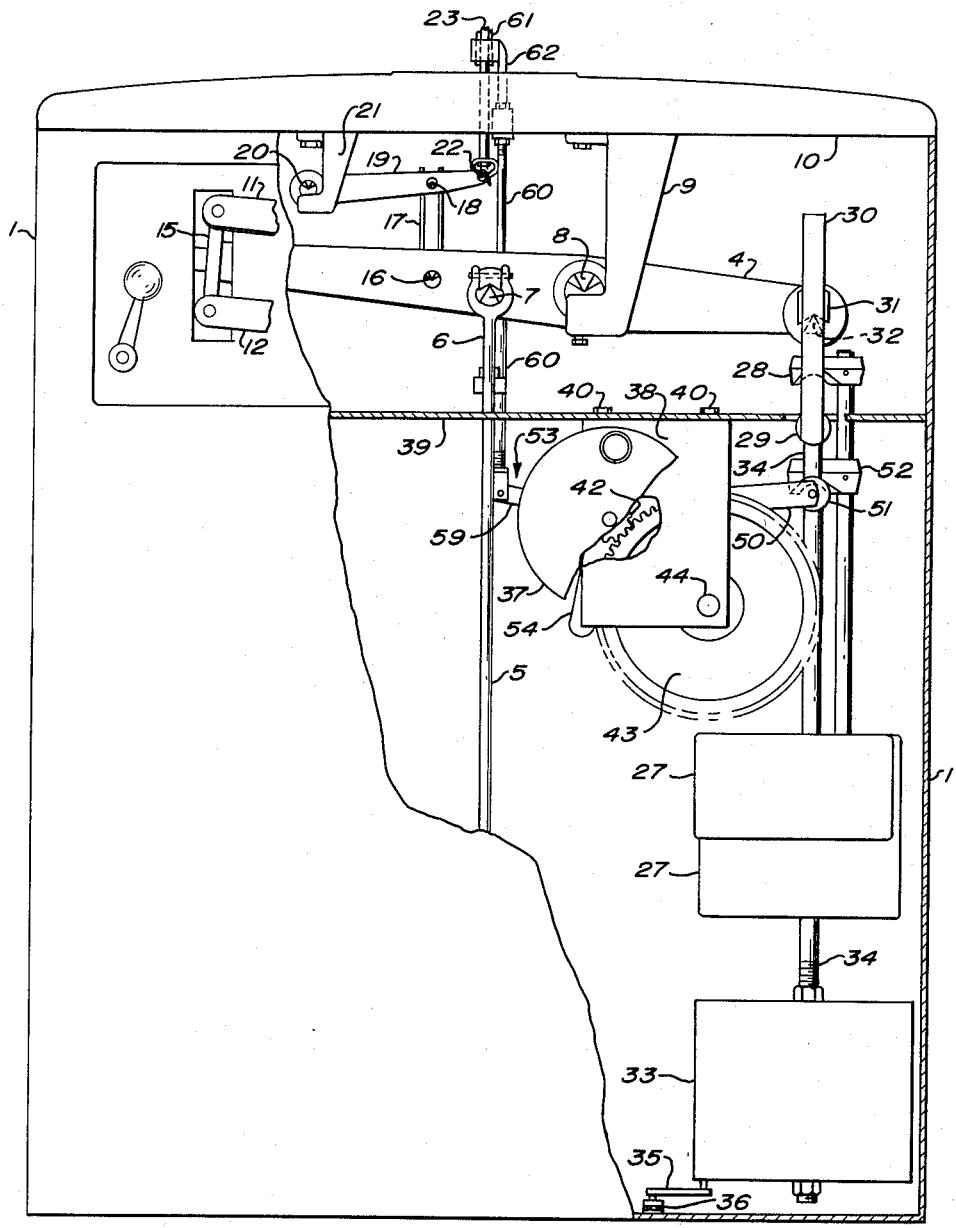
Fig. II

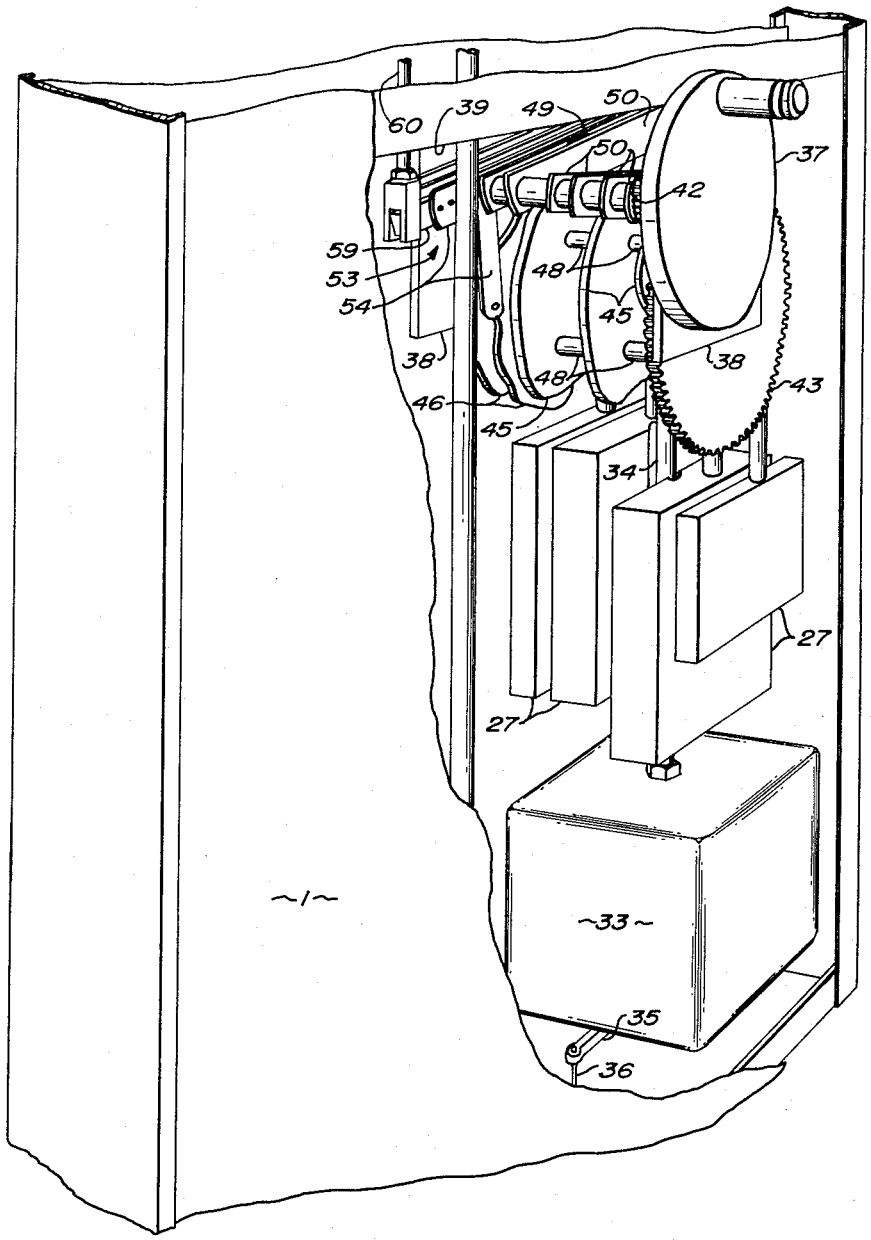
Fig. III
INVENTORS
ROBERT O. BRADLEY
CLAYTON H. MAURICE JR.

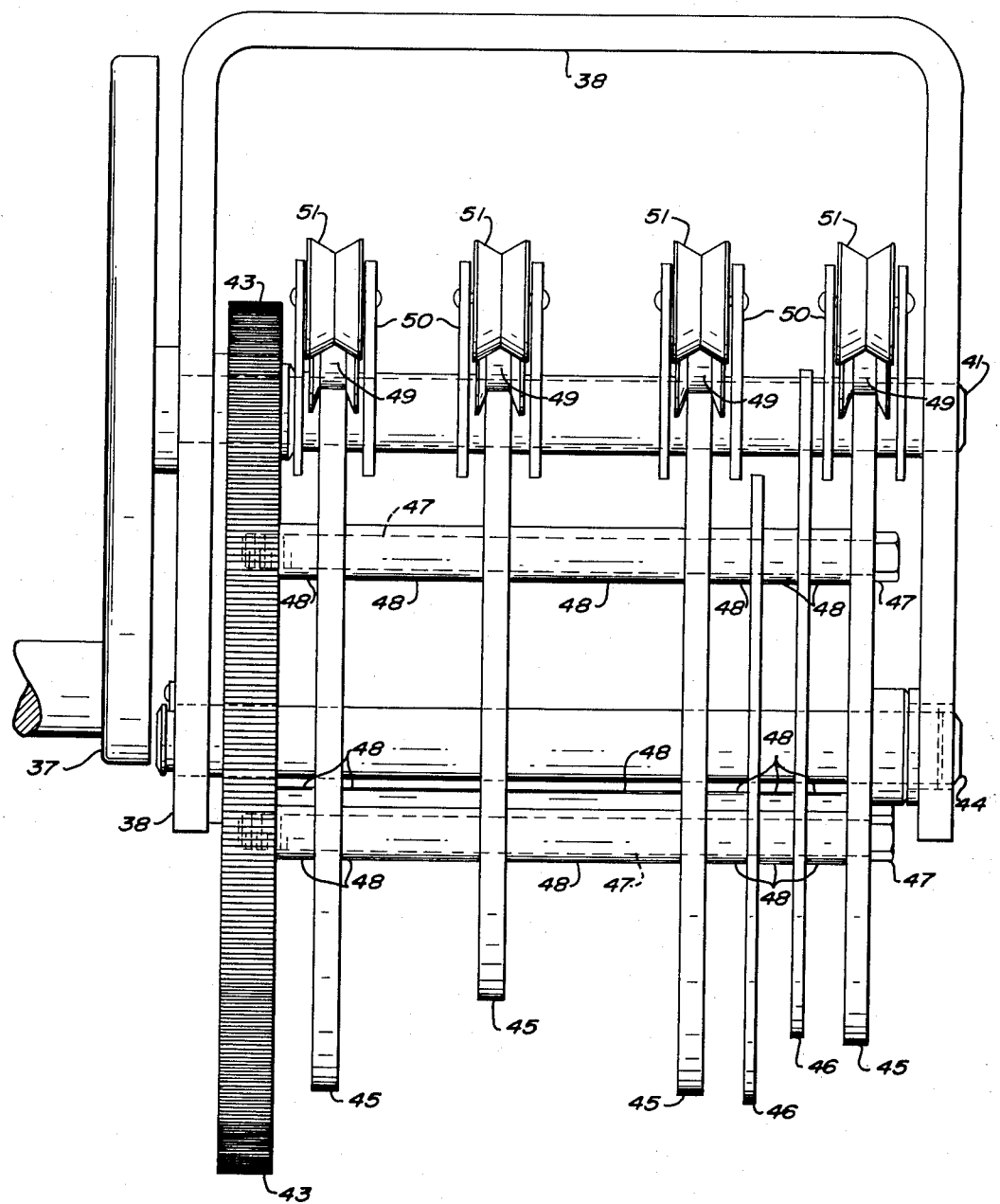

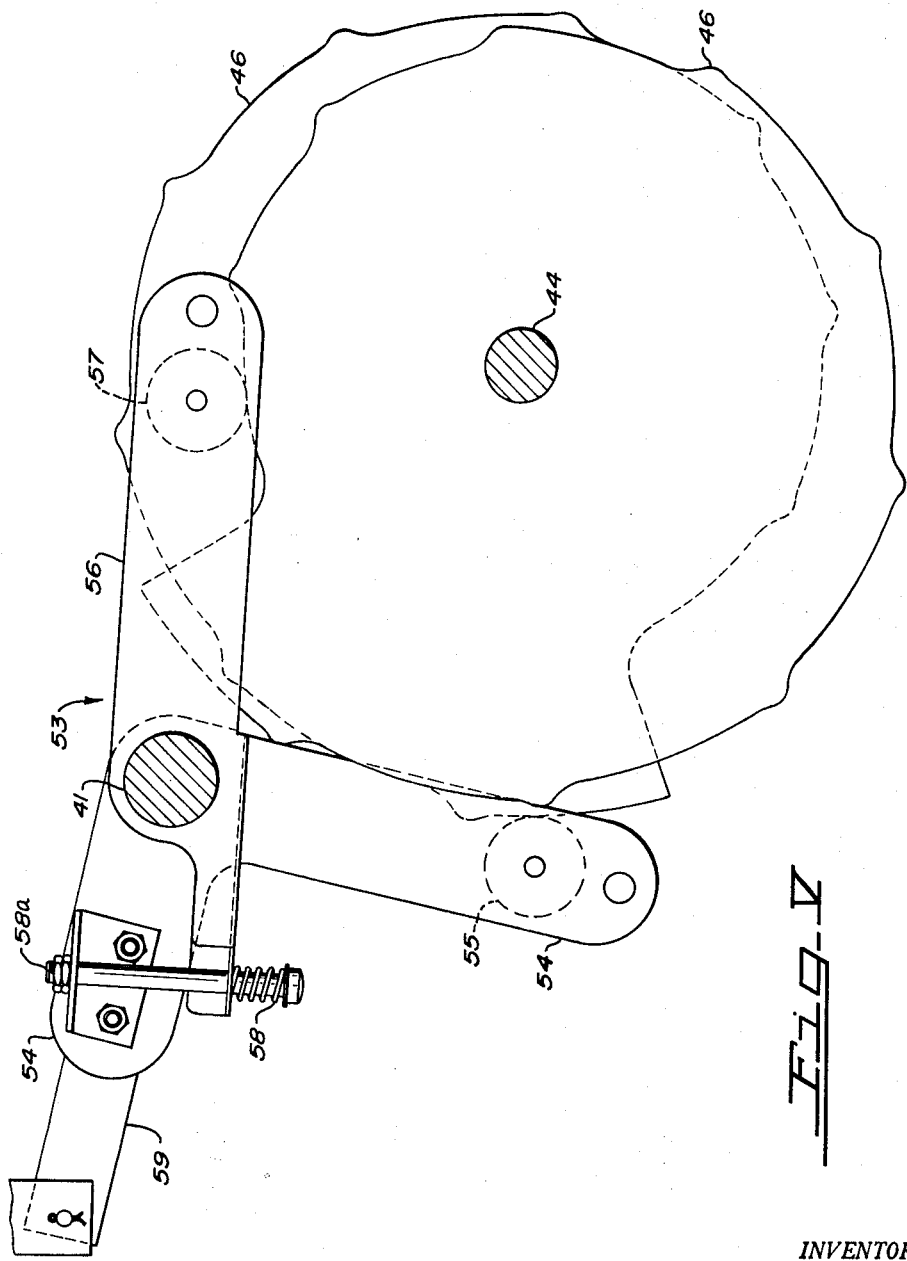

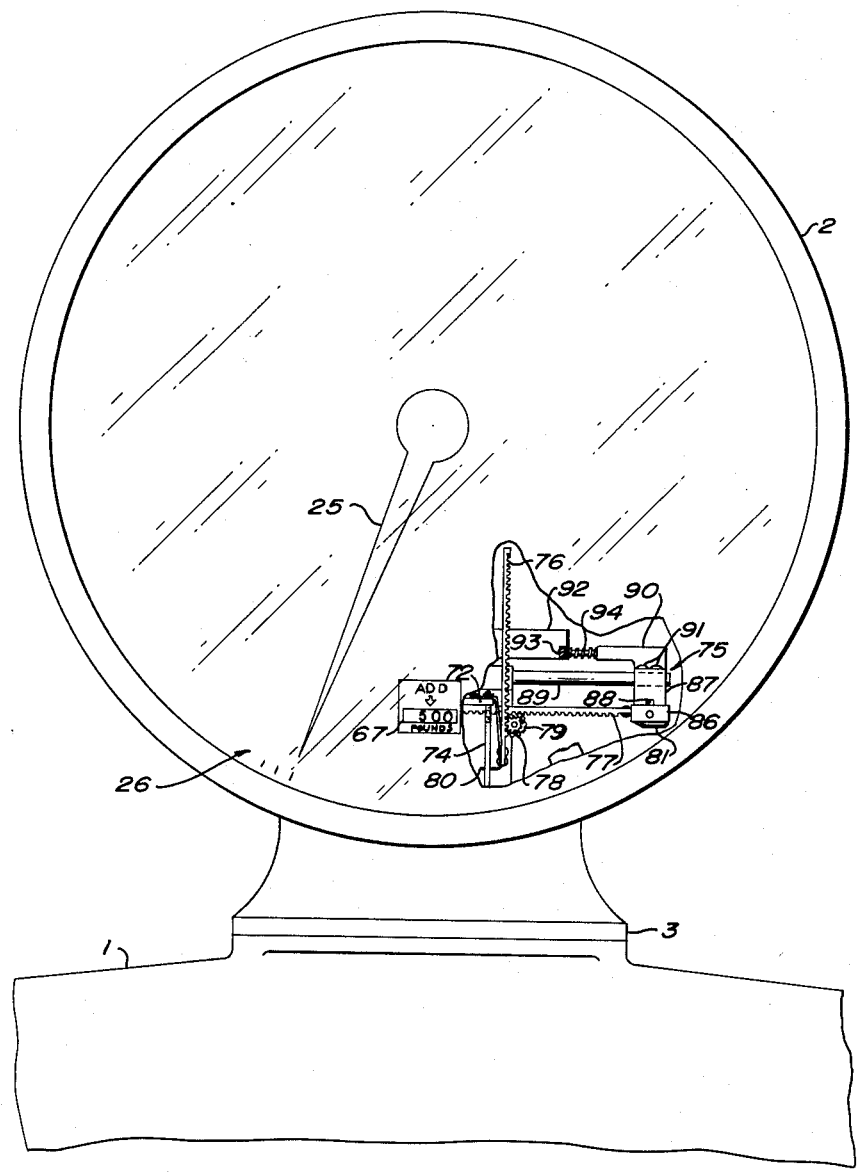
Fig. VI

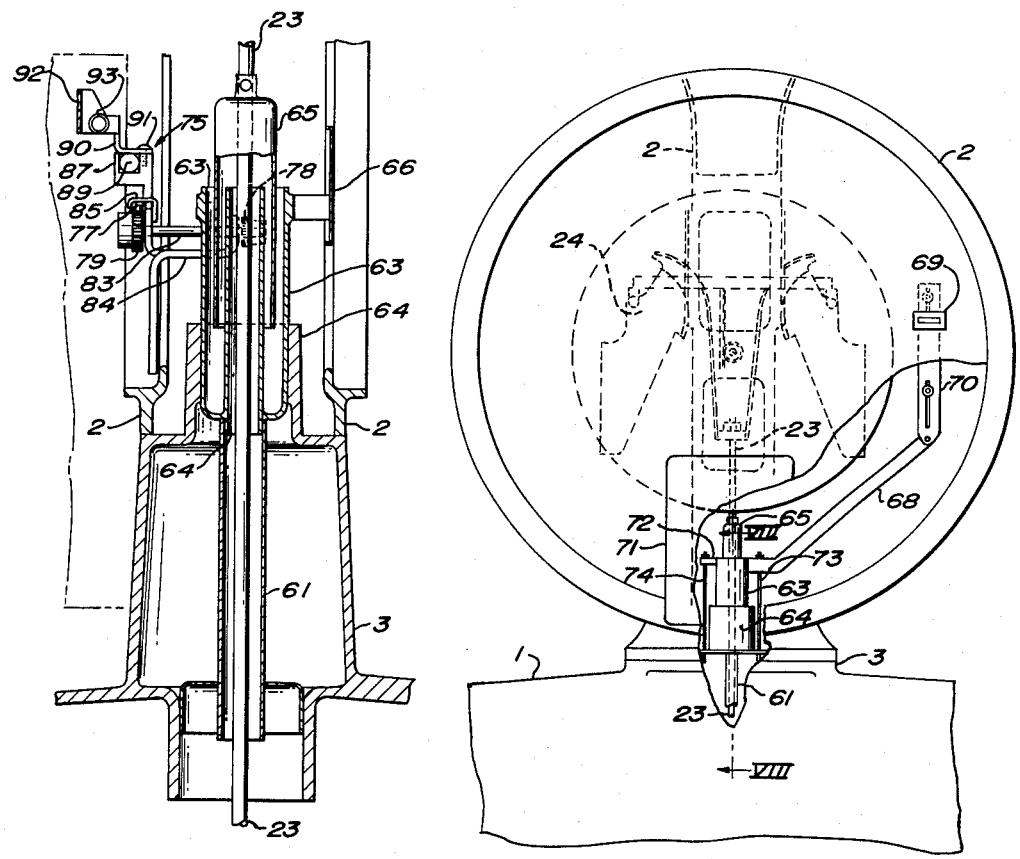

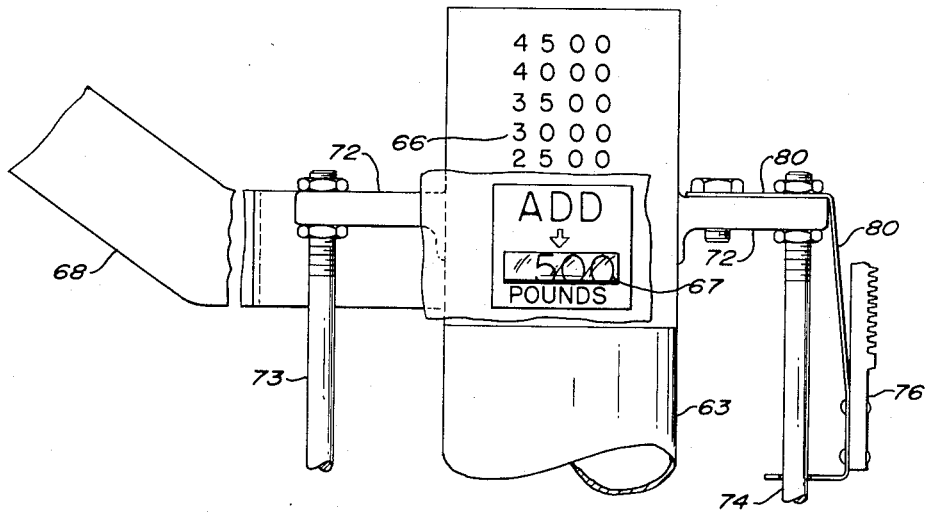
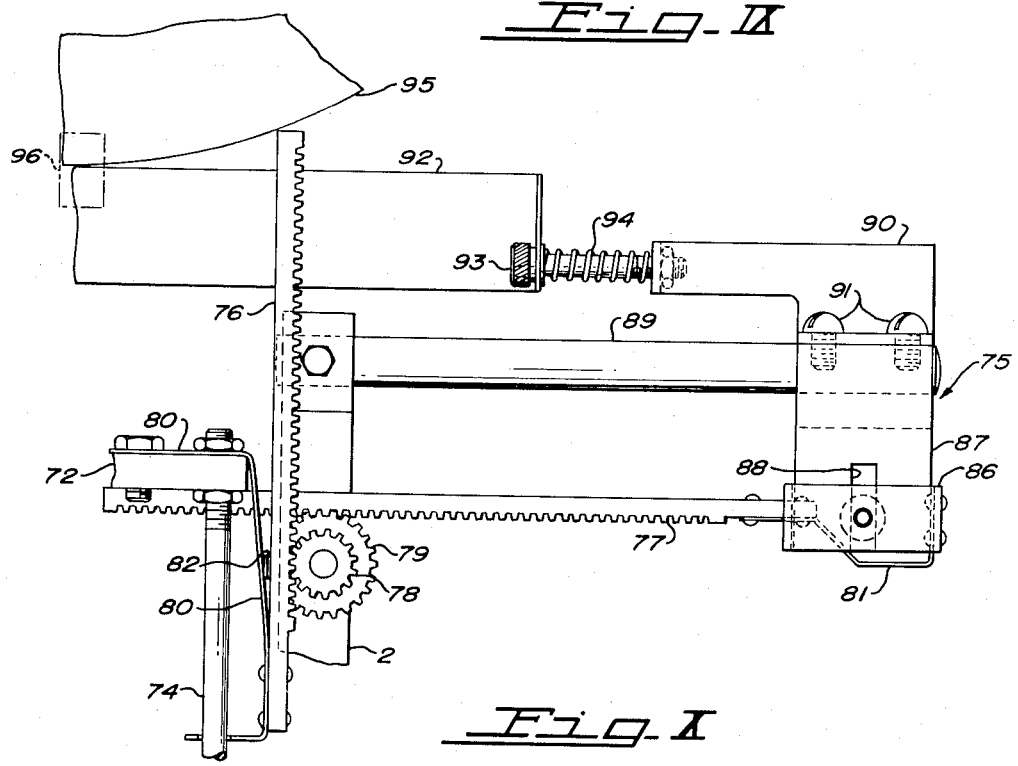

United States Patent Office 2,724,585
Patented Nov. 22, 1955

2,724,585

DRIVE FOR AUXILIARY LOAD PRINTING AND INDICATING MECHANISM

Robert O. Bradley and Clayton H. Maurice, Jr., Toledo, Ohio, assignors to Toledo Scale Company, Toledo, Ohio, a corporation of New Jersey Application April 5, 1954, Serial No. 421,108

12 Claims. (Cl. 265—5)

This invention relates generally to weighing scales, and more particularly to scales which are provided with manually applied "unit weights" for increasing the load offsetting capacity.

Many weighing scales are constructed which incorporate additional so-called "unit weights" for increasing the load counterbalancing capacity of the scale without decreasing the sensitivity of indication given by the main scale indicator. This is usually accomplished by means of manually positionable weights which are placed on the weighing scale mechanism, one at a time, and each of which increases the capacity of the scale by some fixed amount, e. g., 500 or 1000 pounds. In scales so equipped, the unit weights may counterbalance as much as nine-tenths of the total weighing capacity of the scale, the remaining portion being counterbalanced by automatic load counterbalancing mechanism and indicated by the regular scale indicator attached thereto. An auxiliary chart or charts operated from the unit weight lifting mechanism provide indication of the load counterbalanced by the unit weights.

In weighing scales having a manipulative unit weight system, it has been customary to make the counterbalancing capacity of each unit weight exactly the same as the capacity of the automatic load counterbalancing means. Manipulation of the unit weight lifting mechanism places one or more unit weights into cooperative relation with the automatic load counterbalancing mechanism when a load on the platform exceeds the automatic counterbalancing capacity. The unit weight lifting mechanism also drives unit weight or auxiliary load printing mechanism and unit weight or auxiliary load visual indicating mechanism.

Heretofore, difficulty has been experienced with that part of the unit weight lifting mechanism used as the drive for the auxiliary load printing and indicating mechanism, because such mechanism would not always fail safe, i. e., it sometimes happened that, when the unit weight lifting mechanism was operated to place one or more unit weights into cooperative relation with the load counterbalancing mechanism or to remove such weights therefrom, the auxiliary load printing and indicating mechanisms would not be driven to their proper stations. Thus, an incorrect indication of the increased or decreased weighing capacity of the scale, that achieved by the addition or the removal of the unit weights, would be given.

Heretofore, difficulty has also been experienced with the drive for the auxiliary load printing mechanism because back lash developed in the drive system which comprises rack and pinion connections.

The principal object of this invention is to provide a manipulative unit weight system adapted to provide a fail safe drive for auxiliary load printing mechanism and auxiliary load visual indicating mechanism.

More specifically, the principal object of this invention is to provide a manipulative unit weight system adapted to provide a cam operated positive drive in two directions for auxiliary load printing mechanism and auxiliary load visual indicating mechanism.

Another object is to provide a back lash free drive for the auxiliary load printing mechanism.

More specific objects and advantages are apparent from the following description of a specific embodiment of the invention.

According to the invention, a weighing scale having an automatic load counterbalancing system is provided with a manipulative unit weight system adapted to provide a positive drive in two directions for auxiliary load printing mechanism and auxiliary load visual indicating mechanism. The positive drive comprises a pair of identically shaped, inversely mounted, rigidly connected cams driving a follower positively in both directions. A back lash free drive for the auxiliary load printing mechanism is provided and includes a slidably mounted sleeve, a member slidably mounted in the dial housing of the scale, a pair of racks, a pair of rigidly connected pinions journaled in the dial housing one engaging each rack, resilient means interposed between the sleeve and a rack, and an additional resilient means interposed between said member and the other rack, the resilient means and the additional resilient means urging the racks into engagement with the pinions for elimination of back lash.

The invention may be more readily understood from the following detailed description of a specific embodiment in which description reference is made to the accompanying drawings:

In the drawings:

Figure I is a perspective view of a unit weight cabinet and of a dial housing of a weighing scale having an improved drive for auxiliary load printing mechanism and auxiliary load visual indicating mechanisms.

Figure II is a front elevational view of the unit weight cabinet of the weighing scale, parts of the cabinet being broken away.

Figure III is a perspective view of a portion of the interior of the unit weight cabinet showing the unit weights and their lifting mechanism.

Figure IV is a side elevational view of the unit weight lifting mechanism.

Figure V is a front elevational view of cams and their followers which drive the auxiliary load printing mechanism and the auxiliary load visual indicating mechanisms.

Figure VI is a front elevational view of the dial housing, parts of the housing being broken away to show a spring-mounted rack drive for the auxiliary load printing mechanism.

Figure VII is a rear elevational view of the dial housing, parts of the housing being broken away to show rear indication auxiliary load visual indicating mechanism and the drive therefor.

Figure VIII is a vertical sectional view taken along the line VIII—VIII of Figure VII.

Figure IX is a fragmentary detailed view showing front indication auxiliary load visual indicating mechanism.

Figure X is a fragmentary detailed view showing the spring-mounted rack drive for the auxiliary load printing mechanism.

These specific drawings and the accompanying description are intended merely to illustrate the invention but not to limit its scope.

A weighing scale embodying the invention includes a lower frame or cabinet 1 surmounted by an upper frame or dial housing 2 erected on a collar 3. A load receiving mechanism (not shown) is provided which includes the usual load supporting levers and load receiving platform. The load moment is transmitted to a tare beam lever 4 through a suitable stirrup on the nose of the load supporting levers through a rod 5, suspended by means of a stirrup 6 from laterally extending pivots 7 in the tare beam lever 4, which, by means of fulcrum pivots 8, is rockably mounted upon a fulcrum stand 9 fixedly hung from a ceiling 10 in the interior of the cabinet 1. The tare beam lever 4 carries tare beams 11 and 12, with their poises 13 and 14, bolted to projecting arms 15 which beams and cooperating poises serve to offset tare weights. The cabinet 1 is usually mounted adjacent the load receiving platform in such a position that the depending rod 5 is vertically positioned to engage the aforementioned stirrup in the nose of the load supporting lever system. Although an extension lever may be interposed between the nose end and the rod 5 the length of such extension lever is necessarily limited.

Load forces to be counterbalanced are transmitted from the tare beam lever 4 through a power pivot 16 and connecting linkage 17 to a load pivot 18 of a second lever 19, which, by means of fulcrum pivots 20, is rockably mounted upon a fulcrum bracket 21 fixedly hung from the ceiling 10 of the cabinet 1. The second lever 19 has a power pivot 22 engaging a bearing at the lower end of a steelyard rod 23 that extends upwardly into the dial housing 2 and is connected to automatic load counterbalancing mechanism 24 (Figure VII) enclosed within the dial housing 2. An indicator 25 cooperates with a series of indicia marked on the exposed face of a chart 26 to indicate the weights of loads.

Auxiliary load counterbalancing mechanism is also provided in the weighing scale. This comprises a plurality of individual unit weights 27 having first hooked portions 28 which may be successively and individually hooked over a hanger bar 29 secured to the lower ends of plates 30 whose upper ends are provided with V-bearings 31 which are supported upon laterally extending pivots 32 in the tare beam 4 on the opposite side of the fulcrum point of the tare beam 4 from the connection between the rod 5 and the tare beam. For counterbalancing the dead weight of the load receiving platform and the lever system, not counterbalanced by the load counterbalancing mechanism when in initial position, a hollow chamber 33, suspended by means of a rod 34 rigidly attached to the hanger bar 29, is provided for the reception of lead or other counterbalancing material. Swinging motion, or oscillation of the chamber 33 about its suspension point on the hanger bar 29, is prevented by a check link 35 whose ends pivotally engage the chamber 33 and a fulcrum stand 36 which is mounted upon the bottom of the cabinet 1.

Unit weight lifting mechanism is provided so that the unit weights 27 may be manually applied to or taken from the hanger bar 29 by manipulation of a handle 37 located on the outside of the cabinet 1. Each time the handle 37 is turned clockwise 180 degrees the capacity of the scale is increased by a fixed amount equal to the capacity of the chart 26. Although only four unit weights 27 are provided, the weights are applied in combinations to provide nine increases to the capacity of the scale, each increase equal to the capacity of the chart 26. Each time the handle 37 is turned counter-clockwise 180 degrees the capacity of the scale is decreased by a fixed amount equal to the capacity of the chart 26.

The unit weight lifting mechanism is hung as a unit by means of a U-shaped bracket 38 attached to a shelf 39 within the cabinet 1. Removal of nuts 40 allows the bracket 38 carrying all of the unit weight lifting mechanism to be taken out of the cabinet 1. The unit weight lifting mechanism includes the handle 37 fixed to a shaft 41 journaled in the bracket 38 and a pinion 42 also fixed to the shaft 41 which pinion cooperates with a gear 43 fixed to a shaft 44 journaled in the bracket 38. When the handle 37 is turned and the pinion 42 drives the gear 43, lifting cams 45 and cams for driving auxiliary load printing mechanism and auxiliary load visual indicating mechanisms or flash drive cams 46 rigidly attached to the gear 43 by means of bolts 47 threaded into the gear 43 turn in response. The cams 45 and 46 are separated from the gear 43 and from each other by separators 48, the shaft 44 to which the gear 43 is attached passing through a hole cut in each cam.

When the lifting cams 45 are turned, their cooperating follower wheels 49 drive lifting arms 50 rotatably pivoted to the shaft 41 which arms 50 have lifting pulleys 51 attached to the ends of the arms 50 remote from the follower wheels 49. The lifting pulleys 51 cooperate with second hooked portions 52 of the unit weights 27 to move the first hooked portions 28 of the unit weights from or onto the hanger bar 29. The unit weights 27 are applied in combinations to provide nine increases to the capacity of the scale, each increase equal to the capacity of the chart 26 and each increase provided by a 180 degree clockwise turn of the handle 37.

As the lifting cams 45 are turned, the flash drive cams 46, shown in detail in Figure V, are also turned to drive a follower 53 rotatably pivoted to the shaft 41. The flash drive cams 46 are identically shaped, inversely mounted, and, as hereinbefore described, rigidly connected. The follower 53 includes an L-shaped bell crank 54 formed of two identically shaped spaced apart pieces pivoted side by side to the shaft 41 which bell crank 54 carries a roller 55 following one of the flash drive cams 46, and an arm 56 also formed of two identically shaped spaced apart pieces pivoted side by side to the shaft 41 which arm 56 carries a roller 57 following the other flash drive cam 46. The bell crank 54 and the arm 56 cross like the arms of scissors and are squeezed together like the arms of scissors by means of a compression spring 58 attached to a bolt 58a joining the bell crank 54 and the arm 56 causing the bell crank and the arm to press the rollers 55 and 57 into constant yet flexible contact with their respective flash drive cams 46. A bar 59 is rigidly sandwiched between the spaced apart pieces forming the bell crank 54 and extends beyond the bell crank. This construction provides a fail safe, positive drive for the bar 59, i. e., no return means independent of the flash drive cams 46, such as a spring return, is used. The flash drive cams 46 are shaped and positioned to positively drive the bar 59 downward as unit weights are placed by the unit weight lifting mechanism onto the hanger bar 29 and upward as unit weights are removed from the hanger bar 29.

For the purpose of indicating and printing the amount of load on the platform offset by the unit weights 27, when these are cooperating with the automatic load counterbalancing mechanism 24 to counterbalance a load on the platform, the bar 59 is pivotally connected to a flash drive rod 60 extending upwardly within the cabinet 1 which flash drive rod 60 is coupled with a slidable sleeve 61 by means of a connecting member 62. An annular cup 63 (Figure VIII) forming part of an oil seal is slidable in a vertical bore 64 in the upper end of the collar 3. The bottom end of the annular cup 63 has a downwardly directed tenon 64a that is engaged in the upper end of the sleeve 61 connected to the unit weight lifting mechanism controlled by the handle 37. The annular cup 63 is moved up and down to a position that corresponds to the number of unit weights applied to the lever system. The movement of the annular cup 63 is employed to actuate auxiliary load indicating and printing mechanisms within the dial housing 2. The oil seal is completed by a cup 65 that is supported on a steelyard rod 23 leading to the load counterbalancing mechanism 24 and that dips into the annular cup 63. The vertically movable annular cup allows the indicating mechanism of the scale to be rotated to any desired reading position while still permitting the dial housing 2 to be effectively sealed against the entrance of dirt and without interfering with the performance of the auxiliary load indicating and printing mechanisms.

The annular cup 63 drives a unit weight chart plate 66, rigidly attached to the cup, that extends to a position within the field of view of a magnifying lens 67 to give a visual indication from the front of the scale of the amount of load on the platform offset by the unit weights 27.

The annular cup 63 also drives an arm 68 that extends laterally to a position vertically beneath the field of view of a magnifying lens 69. An indicating strip 70 pivotally attached to the arm 68 extends through the field of view of the lens 69 and carries indicia representative of the amount of load on the platform offset by the unit weights 27 to give a visual indication from the rear of the scale of such amount of load. Appropriate lettering adjacent the lens 67 and adjacent the lens 69, e. g. ADD-lbs., serves to call attention to the fact that the amount represented by the indicia within the field of views of the lens 67 and the lens 69 must be added to the amount indicated by the indicator 25 on the chart 26.

The weighing scale is equipped with a printing mechanism that is contained within a housing 71 attached to the rear of the dial housing 2. Auxiliary load printing mechanism which prints the amount of load on the platform offset by the unit weights 27, is operatively driven by the annular cup 63. The annular cup 63 carries a crosshead 72 which in turn carries two rods 73 and 74 which extend downwardly through holes drilled in the dial housing 2. When the annular cup 63 is moved up and down the rods 73 and 74 move up and down within the holes and serve to maintain the position of the annular cup 63 by resisting twisting forces.

The drive for the auxiliary load printing mechanism (Figure X) includes a member 75 slidably mounted on the upper frame 2, a pair of racks 76 and 77, a pair of rigidly connected pinions 78 and 79 journaled in the upper frame 2 and each engaging a rack, and springs 80 and 81 adapted to urge the racks into engagement with the pinions. The rack 76 is resiliently attached to the crosshead 72 through the spring 80 which urges the rack 76 into engagement with the pinion 78. An L-shaped rack retainer 82 attached to the upper frame 2 serves as a guard to prevent the rack 76 from becoming disengaged from the pinion 78. The pinions 78 and 79 are fixedly mounted on a cross shaft 83 (Figure VIII) journaled in a pinion bracket 84 attached to the upper frame 2. The cross shaft 83 also carries the larger pinion 79 that cooperates with the rack 77. A rack retainer 85 attached to the top of the pinion bracket 84 adjacent the pinion 79 serves as a guard to prevent the rack 77 from becoming disengaged from the pinion 79. The rack 77 is resiliently attached to a small L-shaped plate 86 which plate 86 in turn is adjustably attached to a cross head 87 in a slot 88 of the cross head 87. A square shaped groove in the top of the cross head 87 encloses a portion of the bottom and two sides of a horizontally positioned locating bar 89 rigidly attached to the upper frame 2 and an indicator bracket 90 attached to the top of the cross head 87 by means of screws 91 encloses a portion of the top of the locating bar 89. The cross head 87 and the indicator bracket 90 together form the hereinbefore mentioned member 75 slidably mounted on the upper frame 2.

A slide 92 driven by the indicator bracket 90 and attached by means of a cap screw 93, carrying a coil spring 94, to the indicator bracket 90 carries printing indicia which are brought into printing position by movement of the indicator bracket 90. A circular chart 95 (Figure X) that is driven by the load counterbalancing mechanism also carries printing indicia that are brought into printing position within the area outlined by the dotted lines 96 so that printing mechanism, not shown, may record simultaneously the weight offset by the load counterbalancing mechanism as well as the weight offset by the unit weights 27 added to the lever system. The printing mechanism, not a part of the present invention, is preferably of the well known type that employs relatively movable jaws or platens that serve to pinch the circular chart 95 and the slide 92 against an inked ribbon and recording paper.

The embodiment of the invention that has been disclosed may be modified to meet various requirements.

Having described the invention, we claim:

1. In a weighing scale, in combination, a lower frame, a collar mounted on said lower frame, a dial housing mounted on said collar, load counterbalancing and indicating mechanism mounted in said dial housing, a steelyard rod extending through the collar for transmitting force to the load counterbalancing mechanism, a sleeve slidably mounted in the collar, manually operated mechanism mounted in the lower frame and connected to the sleeve for sliding the sleeve in the collar, a rack operatively connected to said slidable sleeve within the dial housing, an indicia bearing member slidably mounted in said dial housing, a second rack operatively connected to said indicia bearing member, a pair of rigidly connected pinions journaled in said dial housing one engaging each rack, and resilient members adapted to urge the racks into engagement with the pinions.

2. In a weighing scale, in combination, a lower frame, collar mounted on said lower frame, an upper frame mounted on said collar, load counterbalancing and indicating mechanism mounted on said upper frame, a steelyard rod extending through the collar for transmitting force to the load counterbalancing mechanism, a sleeve slidably mounted in the collar, manually operated mechanism mounted in the lower frame and connected to the sleeve for sliding the sleeve in the collar, auxiliary load indicating mechanism mounted adjacent the load counterbalancing an indicating mechanism and operatively driven by said sleeve, auxiliary load printing mechanism operatively driven by said sleeve, and means connecting said auxiliary load printing mechanism and said sleeve comprising a pair of racks, a pair of rigidly connected pinions journaled in said upper frame and each engaging a rack, and resilient members adapted to urge said racks into engagement with said pinions.

3. In a weighing scale, in combination, a lower frame, a collar mounted on said lower frame, an upper frame mounted on said collar, load counterbalancing and indicating mechanism mounted on said upper frame, a steelyard rod extending through the collar for transmitting force to the load counterbalancing mechanism, a sleeve slidably mounted in the collar, manually operated mechanism mounted in the lower frame and connected to the sleeve for sliding the sleeve in the collar, auxiliary load printing mechanism operatively driven by said sleeve, and means connecting said auxiliary load printing mechanism and said sleeve comprising a member slidably mounted on said upper frame, a pair of racks, a pair of rigidly connected pinions journaled in said upper frame and each engaging a rack, resilient means operatively connecting said sleeve and one of said racks, and an additional resilient means operatively connecting said member and the other rack, said resilient means and said additional resilient means urging said racks into engagement with said pinions.

4. In a weighing scale assembly having a collar, an upper frame mounted on the collar, automatic load counterbalancing and indicating mechanism mounted on said upper frame, unit weights for increasing the load offsetting capacity, and unit weight lifting mechanism, in combination, a sleeve slidably mounted in the collar and driven by the unit weight lifting mechanism, a rack resiliently mounted on said sleeve, an indicia bearing member slidably mounted on said upper frame, a second rack resiliently mounted on said indicia bearing member, and rigidly connected pinions journaled in said upper frame and each engaging a rack.

5. In a weighing scale having a collar, a dial housing mounted on said collar, load counterbalancing and indicating mechanism mounted in the dial housing, unit weights for increasing the load offsetting capacity, and unit weight lifting mechanism, in combination, a sleeve slidably mounted in the collar and driven by the unit weight lifting mechanism, a rack spring-connected to said slidable sleeve within the dial housing, an indicia bearing member slidably mounted in the dial housing and having a path of movement generally at a right angle to the path of movement of the slidable sleeve, a second rack spring-connected to the indicia bearing member and carried by the indicia bearing member in a path of movement parallel to the path of movement of the indicia bearing member, and a pair of rigidly connected pinions journaled in the dial housing one engaging each rack.

6. In a weighing scale having a lower frame, a collar mounted on the lower frame, a dial housing mounted on said collar, load counterbalancing and indicating mechanism mounted in the dial housing, and unit weights for increasing the load offsetting capacity, in combination, manually operated mechanism mounted in the lower frame for lifting the unit weights, a sleeve slidably mounted in the collar and driven by the manually operated mechanism, a rack spring-connected to said slidable sleeve within the dial housing, an indicia bearing member slidably mounted in the dial housing and having a path of movement generally at a right angle to the path of movement of the slidable sleeve, a second rack spring-connected to the indicia bearing member and carried by the indicia bearing member in a path of movement parallel to the path of movement of the indicia bearing member, and a pair of rigidly connected pinions journaled in the dial housing one engaging each rack.

7. In a weighing scale, in combination, a lower frame, a collar mounted on said lower frame, a dial housing mounted on said collar, load counterbalancing and indicating mechanism mounted in said dial housing, a steelyard rod extending through the collar for transmitting force to the load counterbalancing mechanism, a sleeve slidably mounted in the collar, manually operated mechanism mounted in the lower frame and connected to the sleeve, said manually operated mechanism comprising a pair of cams adapted to provide a positive drive in both directions for sliding the sleeve in the collar, a rack resiliently mounted on said sleeve, an indicia bearing member slidably mounted in said dial housing, a second rack operatively connected to said indicia bearing member, a pair of rigidly connected pinions journaled in said dial housing one engaging each rack, and resilient members adapted to urge the racks into engagement with the pinions.

8. In a weighing scale, in combination, a lower frame, a collar mounted on said lower frame, a dial housing mounted on said collar, load counterbalancing and indicating mechanism mounted in said dial housing, a steelyard rod extending through the collar for transmitting force to the load counterbalancing mechanism, a sleeve slidably mounted in the collar, manually operated mechanism mounted in the lower frame and connected to the sleeve, said manually operated mechanism comprising a pair of cams adapted to provide a positive drive in both directions for sliding the sleeve in the collar, auxiliary load indicating mechanism mounted adjacent the load counterbalancing and indicating mechanism and operatively driven by said sleeve, auxiliary load printing mechanism operatively driven by said sleeve, and means connecting said auxiliary load printing mechanism and said sleeve comprising a pair of racks, a pair of rigidly connected pinions journaled in said upper frame and each engaging a rack, and resilient members adapted to urge said racks into engagement with said pinions.

9. In a weighing scale, in combination, a lower frame, a collar mounted on said lower frame, a dial housing mounted on said collar, load counterbalancing and indicating mechanism mounted in said dial housing, a steelyard rod extending through the collar for transmitting force to the load counterbalancing mechanism, a sleeve slidably mounted in the collar, manually operated mechanism mounted in the lower frame and connected to the sleeve, said manually operated mechanism comprising a pair of cams adapted to provide a positive drive in both directions for sliding the sleeve in the collar, auxiliary load printing mechanism operatively driven by said sleeve, and means connecting said auxiliary load printing mechanism and said sleeve comprising a member slidably mounted in the dial housing, a pair of racks, a pair of rigidly connected pinions journaled in said dial housing one engaging each rack, resilient means interposed between said sleeve and a rack, and an additional resilient means interposed between said member and the other rack, said resilient means and said additional resilient means urging said racks into engagement with said pinions.

10. In a weighing scale, in combination, a lower frame, a collar mounted on said lower frame, a dial housing mounted on said collar, load counterbalancing and indicating mechanism mounted in said dial housing, a steelyard rod extending through the collar for transmitting force to the load counterbalancing mechanism, a sleeve slidably mounted in the collar, manually operated mechanism comprising a pair of identically shaped, inversely mounted, rigidly connected cams positively driving a follower which is connected to the sleeve for sliding the sleeve in the collar, a rack operatively connected to said slidable sleeve within the dial housing, an indicia bearing member slidably mounted in said dial housing, a second rack operatively connected to said indicia bearing member, a pair of rigidly connected pinions journaled in said dial housing one engaging each rack, and resilient members adapted to urge the racks into engagement with the pinions.

11. In a weighing scale having a lower frame, a collar mounted on said lower frame, a dial housing mounted on said collar, load counterbalancing and indicating mechanism mounted in said dial housing, a steelyard rod extending through the collar for transmitting force to the load counterbalancing mechanism, and a sleeve slidably mounted in the collar, manually operated means mounted in the lower frame for sliding the sleeve in the collar comprising a follower and a pair of cams one of which drives the follower in a first direction and the other of which drives the follower in a return direction.

12. In a weighing scale having a lower frame, a collar mounted on said lower frame, a dial housing mounted on said collar, load counterbalancing and indicating mechanism mounted in said dial housing, a steelyard rod extending through the collar for transmitting force to the load counterbalancing mechanism, and a sleeve slidably mounted in the collar, manually operated means mounted in the lower frame for sliding the sleeve in the collar comprising a follower and a pair of identically shaped, inversely mounted, rigidly connected cams one of which drives the follower in a first direction and the other of which drives the follower in a return direction.

References Cited in the file of this patent

UNITED STATES PATENTS

| | | |
|---|---|---|
| 1,864,570 | Williams | June 28, 1932 |
| 2,027,019 | Bryce | Jan. 7, 1936 |
| 2,074,005 | Von Pein | Mar. 16, 1937 |
| 2,193,648 | Schantz | Mar. 12, 1940 |
| 2,622,867 | Williams | Dec. 23, 1952 |